Dec. 10, 1963    R. F. FRICKE    3,114,093
TWO-SPEED SINGLE-PHASE ELECTRIC MOTOR
Filed Sept. 20, 1960

WITNESSES
John F. Heanly, Jr.
James F. Young

INVENTOR
Roger F. Fricke
BY F. P. Lyle
ATTORNEY

United States Patent Office 3,114,093
Patented Dec. 10, 1963

3,114,093
TWO-SPEED SINGLE-PHASE ELECTRIC MOTOR
Roger F. Fricke, American Township, Allen County, Ohio, assignor to Westinghouse Electric Corporation, East Pittsburgh, Pa., a corporation of Pennsylvania
Filed Sept. 20, 1960, Ser. No. 57,246
1 Claim. (Cl. 318—221)

The present invention relates to two-speed single-phase induction motors, and more particularly to an improved two-speed motor of the pole changing type.

Single-phase induction motors of the split phase and capacitor start types have a main primary winding and an auxiliary or starting primary winding, which are displaced from each other by ninety electrical degrees on the stator of the motor and which carry currents differing in phase to produce a starting torque, the auxiliary winding being disconnected when the motor has accelerated to a predetermined speed.

It is often necessary to provide for operation of these motors at either one of two different speeds, and this may done by changing the number of poles of the primary winding. The most obvious way of doing this is to provide two main windings in the motor with different numbers of poles, which can be used alternatively for operation at different speeds. If an auxiliary winding of the same number of poles is provided for each of the main windings, to obtain good starting torque, a total of four primary windings results. Such a motor is very difficult to design and build, however, because of the necessity of providing space in the slots of the stator core for four separate windings, and an undesirable increase in the size of the motor usually results.

Various arrangements have been proposed in which only one auxiliary winding is utilized with two main windings of different numbers of poles, the auxiliary winding being arranged so that at least some of its poles are in the proper position to provide starting torque with either one of the main windings. It has also been proposed to use only two windings of different numbers of poles, with one of the windings arranged so that some of its poles are in the proper position for it to be used as an auxiliary winding for the other winding. With this arrangement, the motor is always started on the same speed and then runs on either one of the two windings after it has started. Either of these proposed arrangements, however, results in relatively poor starting torque, as compared to that of a conventional single speed motor, because of the use of only some of the poles of the starting winding. These proposed arrangements are also frequently quite expensive because of the special winding arrangements which cannot readily be wound on the usual winding machines.

The principal object of the present invention is to provide a two-speed single-phase electrical motor of low cost construction and having good starting and running performance at both speeds.

Another object of the invention is to provide a two-speed single-phase motor having a single main winding and an auxiliary winding of the usual physical arrangement, so that the motor can be wound at low cost on standard winding machines, and which is arranged and connected so that the full starting torque of a conventional single-speed motor is obtained and so that the motor runs at either speed on the same main winding, thus requiring only the usual main and auxiliary windings and resulting in a low cost machine of simple construction in which the most effective use is made of the materials.

Other objects and advantages of the invention will be apparent from the following detailed description, taken in connection with the accompanying drawing, in which.

Figure 1:
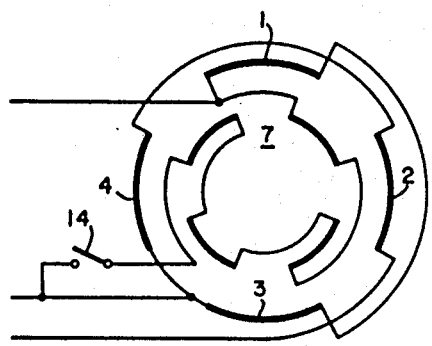
FIGURE 1 is a schematic diagram showing the winding arrangement in an illustrative embodiment of the invention.

The invention is shown in the drawing, for the purpose of illustration, embodied in a motor intended for operation on either four or eight poles, although it will be understood that the invention is not limited to this particular numbers of poles and may be applied to motors of any desired pole number. As shown in FIG. 1, the motor has a main winding which consists of four pole groups 1, 2, 3 and 4 arranged on the stator or primary member of the motor in the same manner as in a conventional single speed motor. The winding itself may be of any suitable type and the pole groups may be of the concentric coil type usually used in single-phase motors, or they may be of any desired type. The physically opposite pole groups 1 and 3 are connected together, as shown, to form one section 5 of the main winding and the pole groups 2 and 4 are similarly connected together to form a second section 6 of the main winding. It will be understood that in a motor having more than four poles, alternate pole groups would be connected together in one section of the winding and the intervening pole groups would be connected together in a second section.

An auxiliary or starting winding 7 is also provided. The auxiliary winding 7 is also a four pole winding displaced ninety electrical degrees from the main winding, and may be of any usual or suitable type. The motor is shown as a split phase motor in which the auxiliary winding is wound with high resistance wire to effect the desired phase difference between the currents in the main and auxiliary windings, but it will be understood that the invention is equally applicable to motors of the capacitor-start type in which the phase displacement is produced by a capacitor connected in series with the auxiliary winding. The motor is shown as having a rotor 8 carrying a secondary winding 9 which may be of the usual squirrel cage type.

It will be noted from FIG. 1 that the physical arrangement of the windings is the same as that of a conventional four pole, single speed motor and the windings can therefore be inserted by a standard winding machine so that no special set up is required and no hand winding is involved. Thus the motor can be produced at low cost. The connections between pole groups of the main winding differ from those of the conventional winding by connecting alternate pole groups in two sections of the winding as described above. The connections of the auxiliary winding 7 are the same as those of a conventional machine, as illustrated in FIG. 1, so that successive pole groups of the auxiliary winding alternate in polarity in the usual manner.

Figure 2:
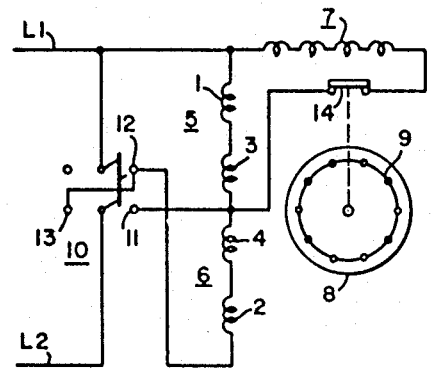
FIG. 2 is a wiring diagram showing the electrical connections of the motor in a simple embodiment of the invention.

The electrical connections of the motor are illustrated in FIG. 2. As there shown, a selector switch 10 is provided which also serves as a line switch in the illustrated embodiment. The switch 10 is shown as a two-pole double-throw switch, and the switch blades are connected to opposite sides of a single-phase line L1, L2. One end of the main winding section 5 and one end of the auxiliary winding 7 are connected together and connected directly to one side L1 of the line. The other end of the winding section 5 and one end of the winding section 6 are connected together and to a terminal 11 of the switch 10. The other end of the winding section 6 is connected to a terminal 12 of the switch 10, and the terminal 12 is also connected to the diagonally opposite terminal 13 of the switch. The free end of the auxiliary winding 7 is connected to the junction of the two main winding sections 5 and 6 through a speed-responsive switch 14. The switch 14 may be any suitable type of switch adapted to open its contacts when the motor has accelerated to a predetermined speed. Thus, the switch 14 may be a centrifugal switch of any usual type, as indicated by the dotted connection to the rotor, or if desired a voltage or current relay might be utilized in a known manner to interrupt the auxiliary winding circuit when the motor reaches a predetermined speed.

To start the motor, the switch 10 is closed in the right hand position, on contacts 11 and 12, which is the high speed position. In this position of the switch, it will be seen that the junction between the winding sections 5 and 6 is connected to one side of the line through contact 11, and that the other ends of the winding sections 5 and 6 are connected together through contact 12 and to the other side of the line. The auxiliary winding 7 is connected directly across the line in parallel with the two sections of the main winding. The connections between the poles of the winding sections 5 and 6 are made as illustrated in FIG. 1 in such a manner that when the two winding sections are connected in parallel to the line, the pole groups of the two sections are of opposite polarity and the polarity of the main winding poles therefore alternates around the stator. A four pole field is thus produced for operation of the motor at the high speed. Since the auxiliary winding 7 is connected directly across the line, and since this winding has the same number of poles as the main winding, the starting torque will be the same as that of a conventional single speed motor, and the motor will start and accelerate to the running speed in the normal manner. The starting switch 14 will of course disconnect the auxiliary winding 7 when the motor has accelerated to a predetermined speed.

If high speed operation is desired, the switch 10 is allowed to remain in the high speed position and the motor will continue to run at that speed. If low speed operation is desired, the switch 10 is moved to its left hand or low speed position after the motor has accelerated to a sufficiently high speed to cause operation of the switch 14. In this position the junction between the two main winding sections is disconnected from the line. One end of the winding section 5 remains connected to one side L1 of the line while the other end of the winding section 6 is connected through contacts 12 and 13 to the other side L2 of the line. Thus the two winding sections 5 and 6 are now connected across the line in series and the polarity of the winding section 6 is reversed from its previous polarity. All four pole groups of the main winding are now of the same polarity so that consequent poles are formed between them and an eight pole field results, causing the motor to run at low speed.

It will be apparent that various modifications may be made in the connections shown. Thus, the two main winding sections might be connected in series for high speed and parallel for low speed, if desired, by reversing the polarity of one section from that shown. Similarly, the connections between poles in either the main winding sections or the auxiliary winding, or both, might be parallel instead of series, if desired. A two-speed motor has thus been provided in which a single main winding is utilized for two-speed operation by changing the connections in a simple manner to provide consequent pole operation for the low speed. It will also be seen that the arrangement described makes it possible to use a standard auxiliary winding having the same number of poles as the main winding, so that a high starting torque is obtained which is essentially the same as that which would be obtained in a conventional single-speed motor. Thus, all of the main winding is used for both speeds of operation, and the auxiliary winding is designed for starting only so that maximum starting torque and the most effective utilization of the copper in the windings are obtained. As previously pointed out, the winding distribution or physical arrangement may be the same as in a single speed motor so that standard winding machines can be used and the cost of winding is thus kept relatively low.

As previously indicated, the motor must always be started on the high speed connection in order to obtain starting torque. In the embodiment of FIG. 1, the switch 10 must always be placed in the high speed position for starting the motor, and if low speed operation is desired, the switch must be manually moved to the low speed position after the motor has started. There is shown in FIG. 3 another embodiment of the invention in which the selector switch can be placed in either the high or low speed position, as desired, and the motor will automatically start on the high connection and run at either high or low speed as determined by the position of the switch.

Figure 3:
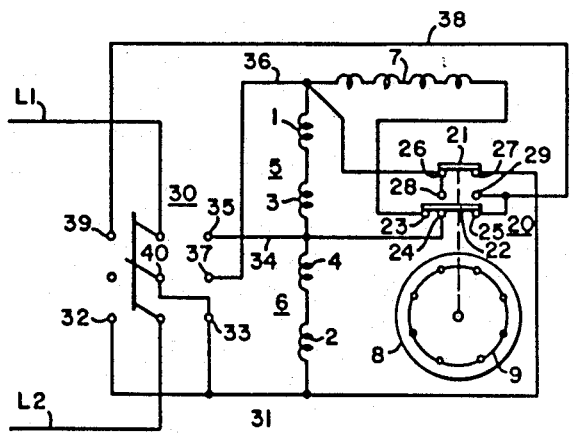
FIG. 3 is a wiring diagram showing the electrical connections of the motor in another embodiment of the invention.

In the arrangement of FIG. 3, the motor itself and the main and auxiliary windings are the same as previously described in connection with FIG. 2. In this embodiment of the invention, however, a special starting switch 20 is utilized. This switch may again be a centrifugal switch or it might be a voltage or current operated relay. As illustrated, the switch 20 has two contact members 21 and 22. In the starting position of the switch shown in the drawing the contact member 22 bridges stationary contacts 23, 24 and 25 and the contact member 21 bridges stationary contacts 26 and 27. When the motor has accelerated to the predetermined speed, the switch 20 moves to its running position in which the contact member 22 bridges the stationary contacts 28 and 29, and the contact members 21 and 22 interrupt the previous connections. The stationary contacts 25 and 29 are connected together, as shown, and contact 26 is connected to contact 28.

A selector switch 30 is provided which also serves as a line switch in the illustrated embodiment. The switch 30 is shown as a three-pole double-throw switch and its outside blades are connected to opposite sides of a single-phase line L1, L2.

In this embodiment of the invention, four leads are brought out from the motor to the switch 30. Thus, a lead 31 is connected to the free end of the main winding section 6 and is connected to the terminals 32 and 33 of the switch 30. A second lead 34 is connected to the junction between the winding sections 5 and 6 and to the terminal 35 of the switch 30. A third lead 36 is connected to the free end of the main winding section 5 and to one end of the auxiliary winding 7, and is connected to the switch terminal 37. A fourth lead 38 is connected to the starting switch contact 29 and to the terminal 39 of the switch 30. The terminal 33 of the switch is connected to the center blade of the switch at terminal 40.

The connections of the starting switch 20 are as shown in FIG. 3. The switch contact 23 is connected to the free end of the auxiliary winding 7. The contact 24 is connected to the lead 34 at the junction between the main winding sections 5 and 6. Contacts 25 and 29 are connected together, as previously mentioned, and to the lead 38. Contact 26 is connected to the lead 36 at the junction between the auxiliary winding 7 and the main winding section 5, and contact 27 is connected to the lead 31 at the free end of the main winding section 6.

If it is desired to operate the motor at high speed, the switch 30 is closed to the right, on the contacts 33, 35 and 37, which is the high speed position. In this position, the line L1 is connected through lead 34 to the junction between the two main winding sections, and through the starting switch contacts 23 and 24 to one end of the auxiliary winding 7. The line L2 is connected through switch terminal 33 and lead 31 to the free end of main winding section 6, and through switch terminals 40 and 37 and lead 36 to the free end of main winding section 5 and the other end of the auxiliary winding 7. Thus the two main winding sections and the auxiliary winding are in parallel across the line, with the polarities of the main winding sections opposite to each other as previously described in connection with FIG. 2, and the motor accelerates as a four pole motor. When the starting switch operating speed is reached, the switch 20 moves to its running position and disconnects the auxiliary winding at the contact 23. The connections of the main winding sections to the line are not affected and the motor continues to run as a four pole motor.

If operation of the motor at low speed is desired, the switch 30 is initially closed in its left hand position on terminals 32 and 39. In this position, and with the starting switch 20 in its starting position, line L1 is connected through switch terminal 39, lead 38, and switch contacts 22, 23 and 24 to one end of the auxiliary winding 7 and to the junction between main winding sections 5 and 6. Line L2 is connected through switch terminal 32 and lead 31 to the free end of winding section 6, and through switch contacts 26 and 27 to the free end of winding section 5 and the auxiliary winding 7. Thus, the main winding sections 5 and 6 and the auxiliary winding 7 are again connected in parallel across the line, with the main winding sections 5 and 6 of opposite polarity, so that the motor starts on the high speed connection and accelerates to the switch operating speed. When this speed is reached, the switch 20 moves to its running position and interrupts the auxiliary winding circuit at the contact 23. The line L1 is now connected through lead 38 and switch contacts 29, 28 and 26 to the free end of the main winding section 5, while the line L2 is connected through switch terminal 32 and lead 31 to the free end of the main winding section 6. The two main winding sections are now in series across the line, with the polarity of winding section 5 reversed so that all pole groups are of the same polarity, and the motor runs as an eight pole motor at low speed.

Thus, in this embodiment of the invention the speed of the motor is selected by placing the selector switch 30 in either the high or low speed position, and the motor then starts in the high speed connection in either case and runs at either high or low speed after operation of the switch 20, as determined by the position of the selector switch 30. The operation of the motor in this embodiment of the invention is the same as in FIG. 2 except that the change to low speed operation is made automatically upon operation of the starting switch 20 if the selector switch 30 is initially in the low speed position.

It should now be apparent that a two-speed single-phase motor has been provided which has many advantages. Thus, the motor can be wound at low cost since the distribution and physical arrangement of the windings are the same as those of a conventional single-speed motor and the windings can be inserted by a standard winding machine. The auxiliary winding has the same number of poles as the main winding and is used only for starting, so that maximum starting torque is obtainable, and the copper in the windings is most effectively used since all of the main winding is utilized at both speeds while the auxiliary winding can be designed specifically for starting in the same manner as in a conventional motor. In this way, highly efficient operation is obtained and the starting and running performance at both speeds are fully equivalent to those of a single-speed motor, and are markedly superior to the characteristics obtainable in previous two-speed motors of equivalent cost. The performance obtainable in the motor of the present invention has previously been obtainable in two-speed motors only by the use of two main windings and corresponding auxiliary windings, making a total of four primary windings, which usually resulted in prohibitive cost or excessive size of the motor. Equally good performance is obtained in the present motor by means of a single main winding and a single auxiliary winding of standard arrangement.

Certain illustrative embodiments of the invention have been shown and described, but it is to be understood that various other embodiments and modifications are possible within the scope of the invention. Thus the invention is applicable to motors having any number of poles as previously indicated. The windings themselves may be of any desired type and the connections between poles in each of the two sections of the main winding and in the auxiliary winding may be either series, as shown, or parallel, depending on the desired characteristics of the motor. It will be obvious that various other modifications and embodiments are possible and all such modifications are within the scope of the invention.

I claim as my invention:

A two-speed single-phase motor having relatively rotatable primary and secondary members, a main primary winding and an auxiliary primary winding on the primary member, the main and auxiliary windings having the same number of pole groups and being physically displaced from each other on the primary member, alternate pole groups of the main winding being connected together in one section of the winding and the intervening pole groups of the main winding being connected together in another section, a first lead connected to one end of the main winding, a second lead connected to the junction between the two sections of the main winding, a third lead connected to the other end of the main winding and to one end of the auxiliary winding, a speed-responsive switch having a starting position and a running position, said switch being adapted in its starting position to connect the other end of the auxiliary winding to said second lead and to a fourth lead and to connect said third lead to the first lead, and said switch being adapted in its running position to connect the third lead to the fourth lead and to interrupt the starting connections, and means for connecting the second lead to one side of a single-phase line and the first and third leads to the other side of the line for operation at one speed and for connecting the fourth lead to one side of the line and the first lead to the other side of the line for operation at another speed.

References Cited in the file of this patent

UNITED STATES PATENTS

| | | |
|---|---|---|
| 1,961,793 | Schaefer | June 5, 1934 |
| 1,983,741 | Dederick | Dec. 11, 1934 |
| 2,689,933 | Veinott | Sept. 21, 1954 |
| 2,840,772 | Seely | June 24, 1958 |
| 3,049,654 | Brucken | Aug. 14, 1962 |